(12) United States Patent
Krause Perin et al.

(10) Patent No.: US 11,366,200 B2
(45) Date of Patent: Jun. 21, 2022

(54) TECHNIQUES TO COMPENSATE FOR MIRROR DOPPLER SPREADING IN COHERENT LIDAR SYSTEMS BY POWER SPECTRUM DENSITY

(71) Applicant: AEVA, INC., Mountain View, CA (US)

(72) Inventors: Jose Krause Perin, Mountain View, CA (US); Mina Rezk, Haymarket, VA (US); Kumar Bhargav Viswanatha, Santa Clara, CA (US); Rajendra Tushar Moorti, Mountain View, CA (US)

(73) Assignee: Aeva, Inc., Mountain View, CA (US)

( * ) Notice: Subject to any disclaimer, the term of this patent is extended or adjusted under 35 U.S.C. 154(b) by 0 days.

(21) Appl. No.: 17/503,076

(22) Filed: Oct. 15, 2021

(65) Prior Publication Data

US 2022/0120871 A1    Apr. 21, 2022

Related U.S. Application Data

(60) Provisional application No. 63/093,599, filed on Oct. 19, 2020.

(51) Int. Cl.
| | |
|---|---|
| *G01S 7/00* | (2006.01) |
| *G01S 7/48* | (2006.01) |
| *G01S 17/32* | (2020.01) |
| *G01S 17/58* | (2006.01) |
| *G01S 7/481* | (2006.01) |
| *G01S 17/08* | (2006.01) |

(52) U.S. Cl.
CPC .......... *G01S 7/4808* (2013.01); *G01S 7/4817* (2013.01); *G01S 17/08* (2013.01); *G01S 17/32* (2013.01); *G01S 17/58* (2013.01)

(58) Field of Classification Search
USPC ........................................ 356/4.01
See application file for complete search history.

(56) References Cited

U.S. PATENT DOCUMENTS

| | | | | |
|---|---|---|---|---|
| 5,082,364 A | * | 1/1992 | Russell | ............... G01S 17/36 356/5.15 |
| 6,384,903 B1 | * | 5/2002 | Fuller | ................... G01J 3/42 356/301 |
| 6,481,268 B1 | * | 11/2002 | Povey | ................ G01N 15/02 73/61.75 |

(Continued)

FOREIGN PATENT DOCUMENTS

EP    2730947 A1 * 5/2014 .......... G01S 7/4818

*Primary Examiner* — James R Hulka
(74) *Attorney, Agent, or Firm* — Womble Bond Dickinson (US) LLP

(57) ABSTRACT

A set of signals are sampled at the LiDAR system and the set of signals are converted to a frequency domain to generate a set of sampled signals in the frequency domain. The set of signals are received consecutively over time. A set of first functions are created based on the set of sampled signals. The set of first functions are averaged to generate a second function. The second function represents a power spectrum density estimate of the set of signals. A peak value of the second function is detected to determine range and velocity information related to a target based on a corresponding frequency of the peak value of the second function.

9 Claims, 9 Drawing Sheets

(56) References Cited

U.S. PATENT DOCUMENTS

| | | | |
|---|---|---|---|
| 6,844,924 B2* | 1/2005 | Ruff | G01S 7/491 356/5.09 |
| 7,170,440 B1* | 1/2007 | Beckner | G01S 7/024 342/118 |
| 7,894,725 B2* | 2/2011 | Holman | H04B 10/508 398/201 |
| 7,965,761 B2* | 6/2011 | Shattil | H04L 27/2637 375/147 |
| 8,212,995 B2* | 7/2012 | Koehler | G02B 27/0927 356/4.01 |
| 8,455,827 B1* | 6/2013 | Chiao | G01N 21/3554 250/339.01 |
| 8,994,925 B2* | 3/2015 | Lewis | G01S 17/10 356/4.01 |
| 9,081,090 B2* | 7/2015 | Sebastian | G01S 17/34 |
| 9,443,535 B2* | 9/2016 | Short | G10L 15/26 |
| 9,575,341 B2* | 2/2017 | Heck | G02F 1/292 |
| 9,606,235 B2* | 3/2017 | Clair | G01B 9/02027 |
| 9,784,560 B2* | 10/2017 | Thorpe | G01B 9/02007 |
| 9,826,216 B1* | 11/2017 | Hazeghi | G02B 27/30 |
| 9,851,433 B2* | 12/2017 | Sebastian | G01S 17/34 |
| 10,003,423 B2* | 6/2018 | Yu | H04L 27/263 |
| 10,203,401 B2* | 2/2019 | Sebastian | G02B 26/06 |
| 10,267,918 B2* | 4/2019 | LaChapelle | H01L 31/1085 |
| 10,355,446 B1* | 7/2019 | Ensher | H01S 5/0617 |
| 10,386,487 B1* | 8/2019 | Wilton | G01S 17/89 |
| 10,401,480 B1* | 9/2019 | Gaalema | G01S 7/4804 |
| 10,473,770 B1* | 11/2019 | Zhu | G01S 17/931 |
| 10,884,130 B1* | 1/2021 | Viswanatha | G01S 17/42 |
| 10,948,598 B1* | 3/2021 | Prabhakar | G01S 7/4817 |
| 11,047,983 B1* | 6/2021 | Prabhakar | G01S 7/499 |
| 11,054,524 B2* | 7/2021 | Rezk | G01S 17/34 |
| 11,213,245 B2* | 1/2022 | Horstmeyer | A61B 5/0075 |
| 11,215,445 B2* | 1/2022 | Nishimori | G01S 7/4812 |
| 2003/0061868 A1* | 4/2003 | Povey | G01N 29/032 73/61.75 |
| 2003/0070474 A1* | 4/2003 | Povey | G01N 29/032 73/61.75 |
| 2003/0076485 A1* | 4/2003 | Ruff | G01S 7/491 356/5.09 |
| 2003/0084734 A1* | 5/2003 | Povey | G01N 15/02 73/866.5 |
| 2004/0065160 A1* | 4/2004 | Povey | G01S 15/885 73/865.5 |
| 2008/0018881 A1* | 1/2008 | Hui | G01S 7/4917 356/5.09 |
| 2009/0087186 A1* | 4/2009 | Holman | H04B 10/508 398/102 |
| 2009/0110033 A1* | 4/2009 | Shattil | H04J 13/0077 375/141 |
| 2011/0228249 A1* | 9/2011 | Koehler | G01S 17/89 356/4.01 |
| 2013/0258312 A1* | 10/2013 | Lewis | G01S 7/4865 356/4.01 |
| 2014/0079248 A1* | 3/2014 | Short | G16B 50/30 381/119 |
| 2014/0163991 A1* | 6/2014 | Short | G10L 13/02 704/258 |
| 2014/0269790 A1* | 9/2014 | Sebastian | G01S 17/34 372/20 |
| 2014/0316771 A1* | 10/2014 | Short | G01S 3/8006 704/201 |
| 2015/0177367 A1* | 6/2015 | Sebastian | G01S 17/34 356/5.09 |
| 2015/0198433 A1* | 7/2015 | Saint Clair | G01C 11/00 356/72 |
| 2015/0287422 A1* | 10/2015 | Short | G01S 13/723 704/205 |
| 2015/0293211 A1* | 10/2015 | Schulz | G01S 7/4917 356/4.01 |
| 2015/0378187 A1* | 12/2015 | Heck | G01S 7/4817 250/227.21 |
| 2016/0071528 A9* | 3/2016 | Short | G01S 3/74 704/201 |
| 2016/0087740 A1* | 3/2016 | Yu | H04L 27/2643 398/76 |
| 2016/0123720 A1* | 5/2016 | Thorpe | G01B 9/02004 356/498 |
| 2016/0161601 A1* | 6/2016 | Sebastian | G02B 26/06 356/5.1 |
| 2016/0352543 A1* | 12/2016 | Hu | H04L 27/26414 |
| 2016/0377721 A1* | 12/2016 | Lardin | H01S 5/0622 356/5.09 |
| 2017/0004844 A1* | 1/2017 | Short | G10L 25/18 |
| 2017/0016983 A1* | 1/2017 | Hoshuyama | G01S 13/584 |
| 2018/0017671 A1* | 1/2018 | Warke | G01S 7/4021 |
| 2018/0074198 A1* | 3/2018 | Von Novak | G01S 17/48 |
| 2018/0284237 A1* | 10/2018 | Campbell | G01S 17/42 |
| 2018/0287505 A1* | 10/2018 | Logan | G01S 7/0234 |
| 2019/0094352 A1* | 3/2019 | Altenmueller | G01S 13/42 |
| 2019/0208112 A1* | 7/2019 | Kleinbeck | G01S 5/0257 |
| 2019/0280608 A1* | 9/2019 | Logan | H03M 13/255 |
| 2019/0310372 A1* | 10/2019 | Crouch | G01S 17/34 |
| 2019/0327124 A1* | 10/2019 | Lai | H04L 27/362 |
| 2019/0331796 A1* | 10/2019 | Pillet | G01S 17/34 |
| 2019/0353789 A1* | 11/2019 | Boloorian | G01S 17/58 |
| 2019/0383907 A1* | 12/2019 | Belsley | G01S 7/4815 |
| 2019/0388018 A1* | 12/2019 | Horstmeyer | A61B 5/0022 |
| 2020/0041651 A1* | 2/2020 | Kapusta | G01S 13/93 |
| 2020/0058316 A1* | 2/2020 | Short | G10L 21/0272 |
| 2020/0072979 A1* | 3/2020 | Boloorian | G01S 7/4915 |
| 2020/0120266 A1* | 4/2020 | Kleinbeck | G06T 7/73 |
| 2020/0241139 A1* | 7/2020 | Roos | G01S 17/89 |
| 2020/0284883 A1* | 9/2020 | Ferreira | G01S 7/484 |
| 2020/0300610 A1* | 9/2020 | Nishimori | G01S 7/4812 |
| 2020/0408875 A1* | 12/2020 | Mai | H04W 24/08 |
| 2021/0084217 A1* | 3/2021 | Kleinbeck | G01S 5/0257 |
| 2021/0096228 A1* | 4/2021 | Behzadi | G01S 7/4815 |
| 2021/0132226 A1* | 5/2021 | Rezk | G01S 17/58 |
| 2021/0215788 A1* | 7/2021 | Hu | G01S 13/42 |
| 2021/0389420 A1* | 12/2021 | Roger | G01S 13/58 |

* cited by examiner

TECHNIQUES TO COMPENSATE FOR MIRROR DOPPLER SPREADING IN COHERENT LIDAR SYSTEMS BY POWER SPECTRUM DENSITY

RELATED APPLICATIONS

This application claims priority from and the benefit of U.S. Provisional Patent Application No. 63/093,599 filed on Oct. 19, 2020, the entire contents of which are incorporated herein by reference in their entirety.

TECHNICAL FIELD

The present disclosure relates generally to light detection and ranging (LiDAR) systems, for example, techniques to compensate for mirror Doppler spreading in coherent LiDAR systems.

BACKGROUND

Frequency-Modulated Continuous-Wave (FMCW) LiDAR systems include several possible phase impairments such as laser phase noise, circuitry phase noise, flicker noise that the driving electronics inject on a laser, drift over temperature/weather, and chirp rate offsets. A scanning FMCW LiDAR system may use a moving scanning mirror to steer light beams and scan a target or a target environment. To achieve a wide field of view and high frame rates, the scanning mirror may have a high angular speed. The high mirror angular speed may cause several impairments. For example, the mirror-induced Doppler shift may broaden the received signal bandwidth. The received signal intensity may be lowered, and consequently the detection probability may be reduced. Thus, the error in range, velocity, and reflectivity measurements may be increased.

SUMMARY

The present disclosure describes various examples, without limitation, methods of processing signal in LiDAR systems.

In some examples, disclosed herein is a method for determining range and velocity information related to a target in a light detection and ranging (LiDAR) system. In this approach, the input spectrum of the signal across consecutive measurements are filtered, for example, by averaging a number of measurements of the input spectrum. As the number of measurements of the input spectrum grows, the output spectrum converges to the power spectrum density (PSD) of the signal, resulting in more accurate frequency and energy measurements. A PSD estimate may be obtained by averaging multiple frequency measurements across time. The output of the PSD estimate is then used in a peak search to find the peak of the signal, resulting in smaller frequency and energy measurement errors than using the input spectrum directly. In this way, the measured error due to the frequency spreading caused by mirror-induced Doppler may be improved. Thus, more accurate frequency and energy measurements may be achieved, thereby increasing the accuracy in range, velocity, and reflectivity measurements of the target.

In some examples, a method for determining range and velocity information related to a target in a LiDAR system is disclosed herein. A set of signals are sampled at the LiDAR system and the set of signals are converted to a frequency domain to generate a set of sampled signals in the frequency domain. The set of signals are received consecutively over time. A set of first functions are created based on the set of sampled signals. The set of first functions are averaged to generate a second function. The second function represents a power spectrum density estimate of the set of signals. A peak value of the second function is detected to determine range and velocity information related to a target based on a corresponding frequency of the peak value of the second function.

In some examples, a LiDAR system is disclosed herein. The LiDAR system comprises a processor and a memory to store instructions that, when executed by the processor, cause the system to sample a set of signals at the LiDAR system and convert the set of signals to a frequency domain to generate a set of sampled signals in the frequency domain, where the set of signals are received consecutively over time. The LiDAR system is further to create a set of first functions based on the set of sampled signals. The LiDAR system is further to average the set of first functions to generate a second function, where the second function represents a power spectrum density estimate of the set of signals. The LiDAR system is further to detect a peak value of the second function to determine range and velocity information related to a target based on a corresponding frequency of the peak value of the second function.

In some examples, a LiDAR system is disclosed herein. The LiDAR system comprises a first optical source to transmit a portion of a first light signal towards a target; a second optical source to transmit a portion of a second light signal towards a target; an optical receiver to receive a first return signal from the target based on the first light signal and a second return signal from the target based on the second light signal. The LiDAR system further comprises a circuitry; and a memory to store instructions that, when executed by the circuitry, cause the system to: sample a set of signals at the LiDAR system and convert the set of signals to a frequency domain to generate a set of sampled signals in the frequency domain, where the set of signals are received consecutively over time; create a set of first functions based on the set of sampled signals; average the set of first functions to generate a second function, where the second function represents a power spectrum density estimate of the set of signals; and detect a peak value of the second function to determine range and velocity information related to a target based on a corresponding frequency of the peak value of the second function.

These and other aspects of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and examples, should be viewed as combinable unless the context of the disclosure clearly dictates otherwise.

It will therefore be appreciated that this Summary is provided merely for purposes of summarizing some examples so as to provide a basic understanding of some aspects of the disclosure without limiting or narrowing the scope or spirit of the disclosure in any way. Other examples, aspects, and advantages will become apparent from the following detailed description taken in conjunction with the accompanying figures which illustrate the principles of the described examples.

BRIEF DESCRIPTION OF THE DRAWINGS

For a more complete understanding of various examples, reference is now made to the following detailed description taken in connection with the accompanying drawings in which like identifiers correspond to like elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

The described LiDAR systems herein may be implemented in any sensing market, such as, but not limited to, transportation, manufacturing, metrology, medical, virtual reality, augmented reality, and security systems. According to some embodiments, the described LiDAR system may be implemented as part of a front-end of frequency modulated continuous-wave (FMCW) device that assists with spatial awareness for automated driver assist systems, or self-driving vehicles.

Figure 1A:
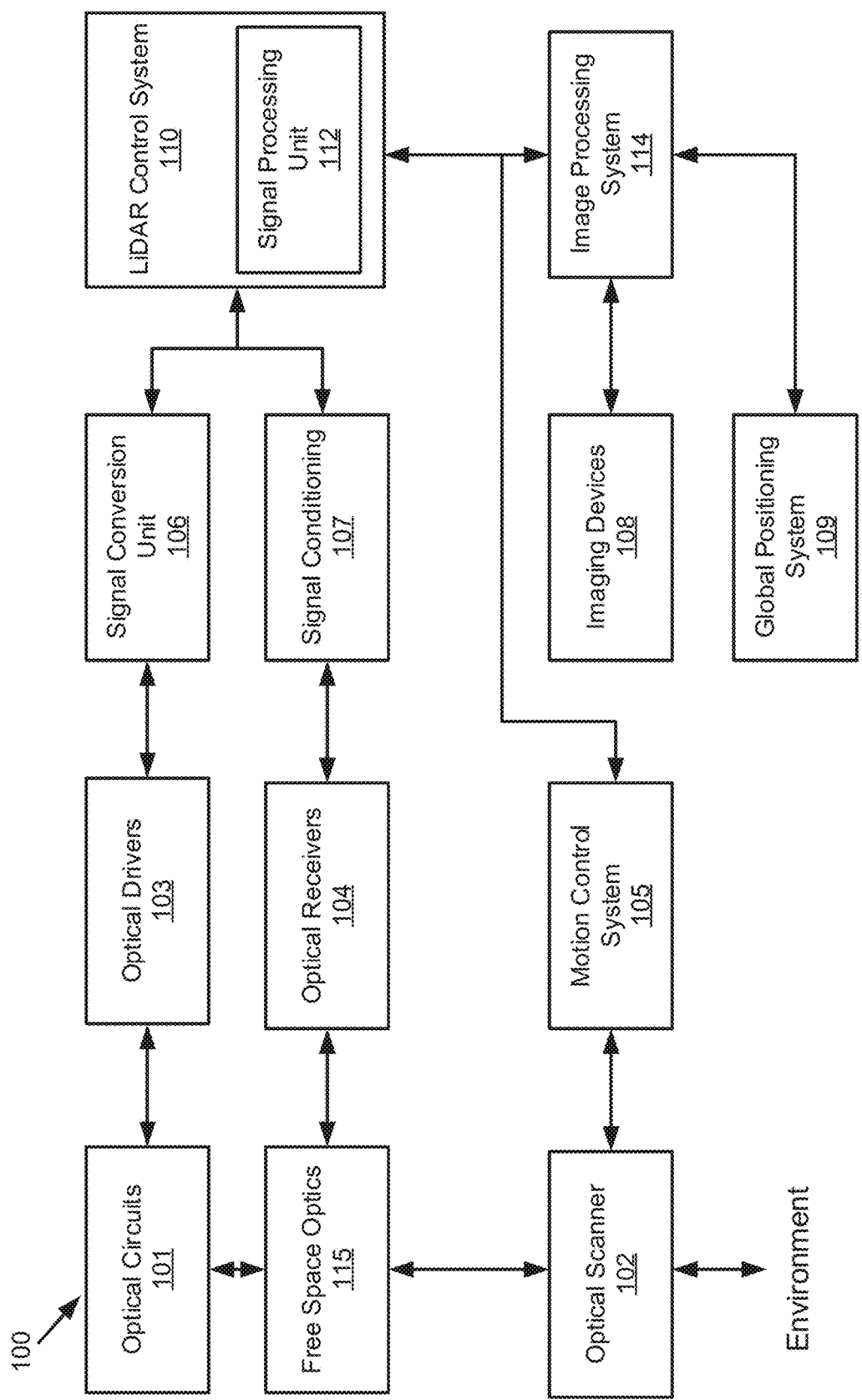
FIG. 1A is a block diagram illustrating an example LiDAR system according to embodiments of the present disclosure.

FIG. 1A is a diagram illustrates a LiDAR system 100 according to example implementations of the present disclosure. The LiDAR system 100 includes one or more of each of a number of components, but may include fewer or additional components than shown in FIG. 1. According to some embodiments, one or more of the components described herein with respect to LiDAR system 100 can be implemented on a photonics chip. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles.

In some examples, the LiDAR system 100 includes an optical scanner 102 that includes one or more scanning mirrors that are rotatable along an axis (e.g., a slow-moving-axis) that is orthogonal or substantially orthogonal to the fast-moving-axis of the diffractive element to steer optical signals to scan a target environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coating window or the like.

To control and support the optical circuits 101 and optical scanner 102, the LiDAR system 100 includes LiDAR control systems 110. The LiDAR control systems 110 may include a processing device for the LiDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LiDAR control systems 110 may include a signal processing unit 112 such as a digital signal processor (DSP). The LiDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LiDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LiDAR control systems 110 to signals interpretable by the galvanometers in the optical scanner 102. In some examples, a motion control system 105 may also return information to the LiDAR control systems 110 about the position or operation of components of the optical scanner 102. For example, an analog-to-digital converter may in turn convert information about the galvanometers' position to a signal interpretable by the LIDAR control systems 110.

The LiDAR control systems 110 are further configured to analyze incoming digital signals. In this regard, the LiDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LiDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LiDAR control systems 110. In some examples, the signals from the optical receivers 104 may be subject to signal conditioning by signal conditioning unit 107 prior to receipt by the LiDAR control systems 110. For example, the signals from the optical receivers 104 may be provided to an operational amplifier for amplification of the received signals and the amplified signals may be provided to the LIDAR control systems 110.

In some applications, the LiDAR system 100 may additionally include one or more imaging devices 108 configured to capture images of the environment, a global positioning system 109 configured to provide a geographic location of the system, or other sensor inputs. The LiDAR system 100 may also include an image processing system 114. The image processing system 114 can be configured to receive the images and geographic location, and send the images and location or information related thereto to the LiDAR control systems 110 or other systems connected to the LIDAR system 100.

In operation according to some examples, the LiDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LiDAR control systems 110. The LiDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LiDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

The optical scanner 102 in the LiDAR system 100 may include one or more moving scanning mirrors. For instance, as will be described in greater detail herein in FIGS. 3A and 3B, the moving scanning mirror may induce Doppler shift on the outgoing light beam and the incoming light beam, which may be the target return signal. To achieve a wide field of view and high frame rates, the scanning mirror may have a high angular speed. In some scenarios, the high mirror angular speed may cause several impairments. For example, the mirror-induced Doppler shift may broaden the received signal bandwidth. As such, in these scenarios, the received signal intensity may be lowered, and consequently the detection probability may be reduced and cause an increase in errors related to range, velocity, and reflectivity measurements.

Figure 3A:
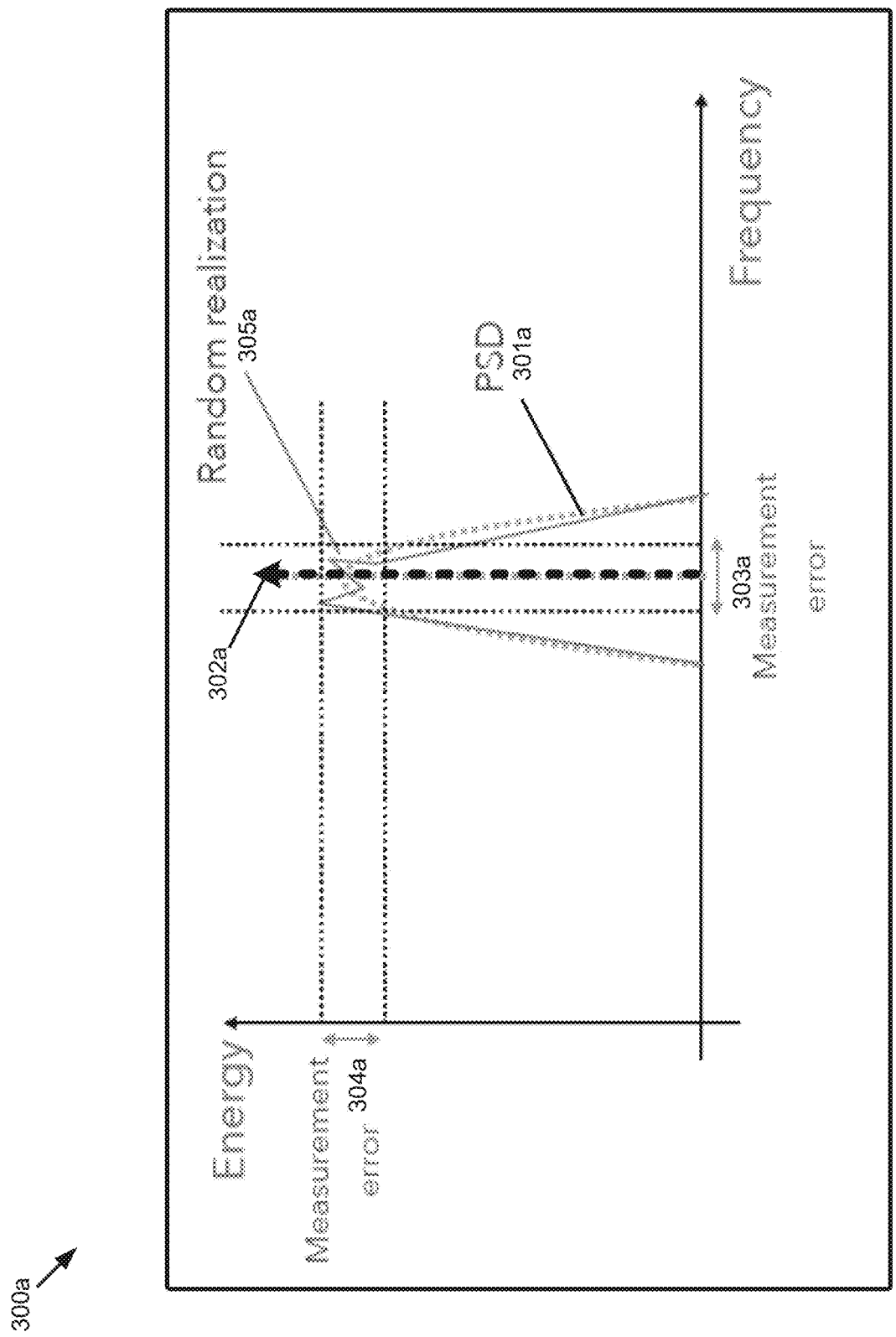
FIG. 3A is a diagram illustrating an example of a received signal spectrum in a LiDAR system, when the scanning mirror has a low speed, according to embodiments of the present disclosure.

As depicted in FIG. 3A, when the scanning mirror is moving at a lower speeds (e.g., <5 kdeg/s), the mirror-induced Doppler has little impact on the signal quality. The peak value 302a may be detected in the PSD 301a of the received signal. The received signal may have random realization 305a, which may be minor. The received signal may have a reasonable range of frequency measurement error 303a and a reasonable range of power measurement error 304a.

Figure 3B:
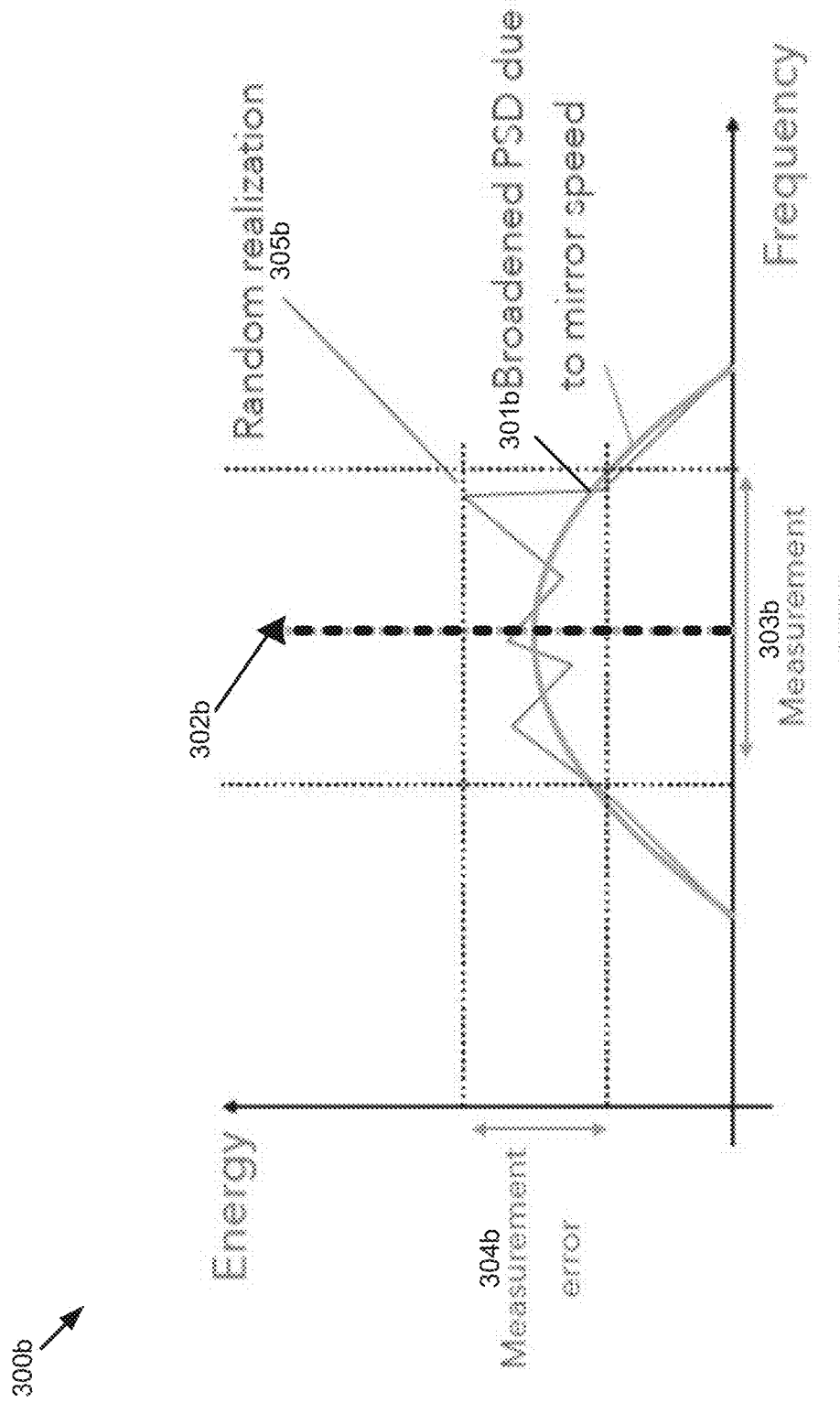
FIG. 3B is a diagram illustrating an example of a received signal spectrum in a LiDAR system, when the scanning mirror has a high speed, according to embodiments of the present disclosure.

As depicted in FIG. 3B, when the scanning mirror is moving at a high mirror speeds (>5 kdeg/s), there may be a significant broadening of the signal PSD 301b. As a result, the measured signal energy may be lower on average. Thus, the probability of detection may be consequently reduced. The measurement error on frequency 303*b* and/or the measurement error on energy 304 *b* may be higher due to the randomness (e.g., random realization) of the signal. For example, the detected signal peak 305*b* may be offset from the location (e.g., frequency) of the true signal peak 302*b* of the PSD 301*b*.

Figure 1B:
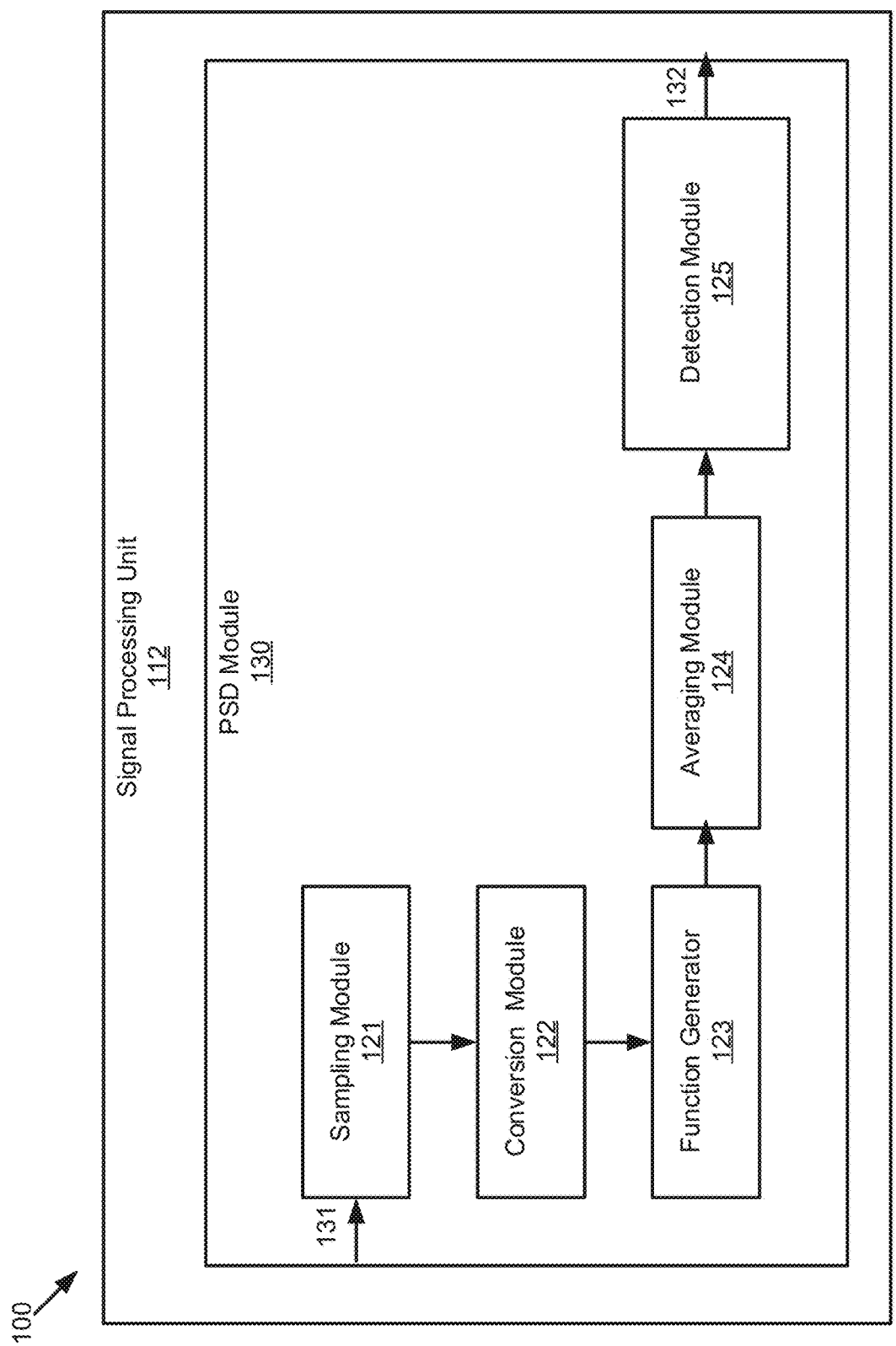
FIG. 1B is a block diagram illustrating an example of a PSD module of a LiDAR system according to embodiments of the present disclosure.

Referring to FIG. 1B, which is a block diagram illustrating an example of a PSD module 130 of the LiDAR system 100 according to embodiments of the present disclosure. To address the above problem, the PSD module is configured to compute a PSD estimate by averaging multiple measurements of an input spectrum across time. The output of the PSD estimate can then be used by components in a peak search to find the peak of the received signal, resulting in smaller frequency and energy measurement errors than using the input spectrum directly. In this way, the measured error due to the frequency spreading caused by mirror-induced Doppler may be improved. Thus, more accurate frequency and energy measurements may be achieved, thereby increasing the accuracy in range, velocity, and reflectivity measurements of the target.

As depicted in FIG. 1A and FIG. 1B, the signal processing unit 112 may include the PSD module 130. It should be noted that, although the PSD module is depicted as residing within the signal processing unit 112, embodiments of the present disclosure are not limited as such. For instance, in one embodiment, the PSD module 130 can reside in computer memory (e.g., RAM, ROM, flash memory, and the like) within system 100 (e.g., LiDAR control system 110). The PSD module 130 may include, but not being limited to, a sampling module 121, a conversion module 122, a function generator 123, an averaging module 124, and a detection module 125. In some embodiments, the PSD module 130 may receive signals from the optical source through the optical receivers 104 or the signal conditioning unit 107 depicted in FIG. 1A.

The sampling module 121 may be configured to sample a set of signals 131 at the LiDAR system 100. The conversion module 122 may be configured to convert the set of signals 131 to a frequency domain to generate a set of sampled signals in the frequency domain. For example, the set of signals 131 may be received consecutively over time. The input spectrum, which refer to the set of signals 131, across consecutive measurements may be received.

The function generator 123 may be configured to create a set of functions based on the set of sampled signals from the sampling module 121 and the conversion module 122. For example, each function may correspond to a measurement of the input spectrum S(f; n), where f represents the frequency, and n represents a number of measurements. The set of functions corresponding to a total of N measurements of input spectrum may be represented as S(f; 1), S(f; 2), . . . , S(f; N).

The averaging module 124 may be configured to compute a PSD estimate by averaging a number of measurements of the input spectrum over time. If there are a total of N measurements of input spectrum S(f; n), the PSD estimate S(f) is computed by averaging all the measurements over time:

$$S(f) = \frac{1}{N}\sum_{n=1}^{N}\hat{S}(f;n)$$

The above PSD function S(f) generated by averaging the set of functions may represent a power spectrum density estimate of the set of signals. The power spectral density (PSD) of the signal describes the power present in the signal as a function of frequency, per unit frequency. As the number of measurements increases, the output spectrum converges to the power spectrum density, resulting in more accurate frequency and energy measurements.

The detection module 125 may be configured to search for a peak in the output of the PSD estimate. The output of the PSD estimate may be used in peak searches performed by the systems described herein. For instance, range and velocity information related to the target may be determined using the result of the peak search 132 based on the PSD estimate resulting in smaller frequency and energy measurement errors than using each individual input spectrum directly.

It should be appreciated that the components depicted may be implemented in software, hardware, or a combination thereof. For example, these modules may be loaded into a memory, and executed by one or more processors. Some of the depicted components may be integrated together as an integrated module resident on the LiDAR systems described herein.

The LiDAR system 100 may use the moving scanning mirror (e.g., included in optical scanner 102) to steer light beams and scan a target or a target environment. Objects in the target environment may scatter an incident light into a return optical beam or a target return signal. The optical scanner 102 also collects the return optical beam or the target return signal. The target return signal may be mixed with a second signal from a local oscillator, and a range dependent beat frequency may be generated. The temporal phase difference between the two waveforms may generate the beat frequency measured on the optical receivers 104 (photodetectors). In one embodiment, the beat frequency may be digitized by an analog-to-digital converter (ADC), for example, in a signal conditioning unit such as signal conditioning unit 107 in LiDAR system 100. In one embodiment, the digitized beat frequency signal may be received by the signal processing unit 112 LiDAR system 100, and then be digitally processed in the signal processing unit 112. The signal processing unit 112 including the PSD module 130 may process the received signal to extract range and velocity information of the target.

Figure 2:
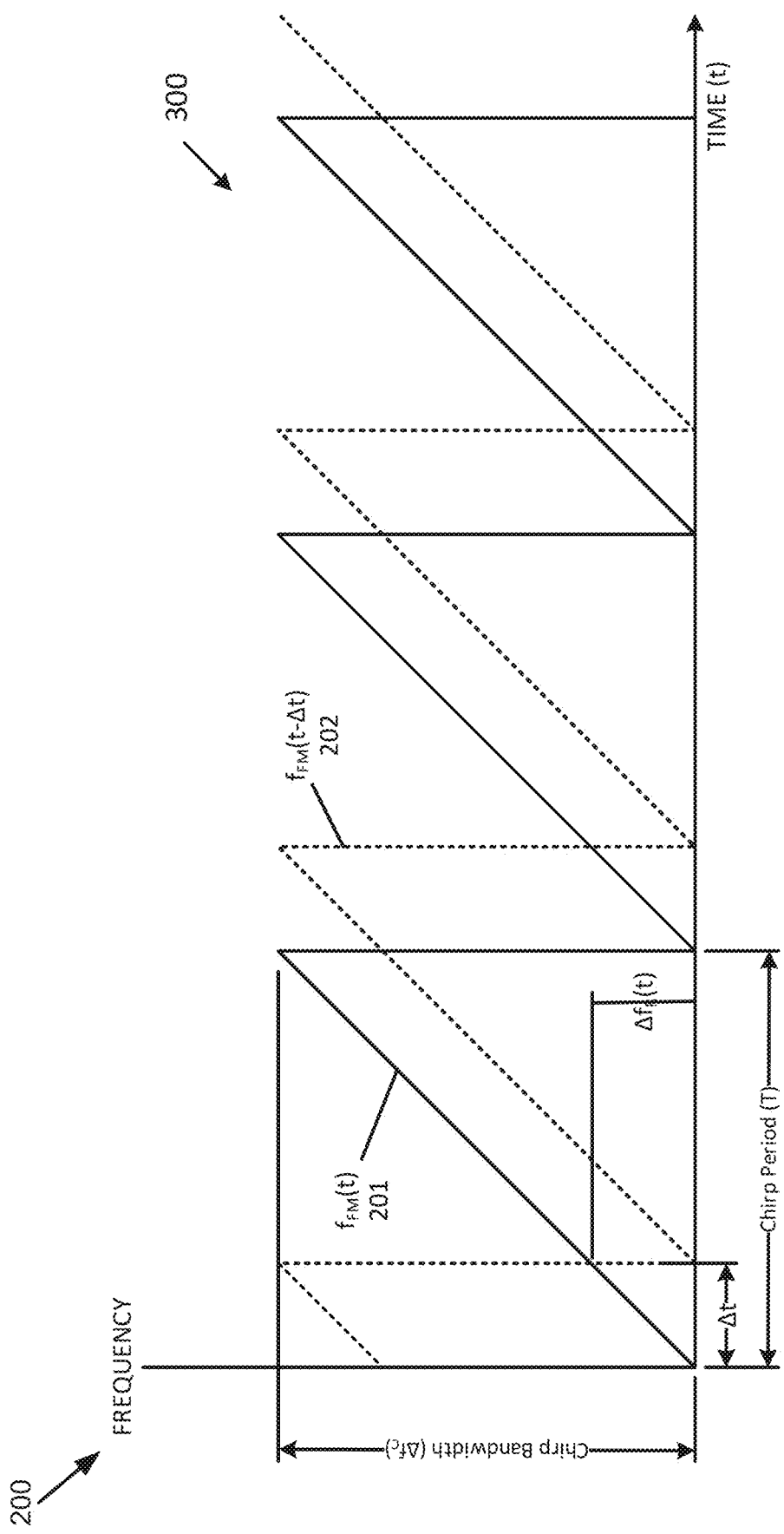
FIG. 2 is a time-frequency diagram illustrating an example of FMCW LIDAR waveforms according to embodiments of the present disclosure.

FIG. 2 is a time-frequency diagram 200 of an FMCW scanning signal 101*b* that can be used by a LiDAR system, such as system 100, to scan a target environment according to some embodiments. In one example, the scanning waveform 201, labeled as $f_{FM}(t)$, is a sawtooth waveform (sawtooth "chirp") with a chirp bandwidth $\Delta f_C$ and a chirp period $T_C$. The slope of the sawtooth is given as $k=(\Delta f_C/T_C)$. FIG. 2 also depicts target return signal 202 according to some embodiments. Target return signal 202, labeled as $f_{FM}(t-\Delta t)$, is a time-delayed version of the scanning signal 201, where $\Delta t$ is the round trip time to and from a target illuminated by scanning signal 201. The round trip time is given as $\Delta t=2R/v$, where R is the target range and v is the velocity of the optical beam, which is the speed of light c. The target range, R, can therefore be calculated as $R=c(\Delta t/2)$. When the return signal 202 is optically mixed with the scanning signal, a range dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also includes a frequency offset (Doppler shift) if the target has a velocity relative to the LIDAR system 100. The Doppler shift can be determined separately, and used to correct the frequency of the return signal, so the Doppler shift is not shown in FIG. 2 for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_{R_{max}}$) is 500 megahertz. This limit in turn determines the maximum range of the system as $R_{max}=(c/2)(\Delta f_{R_{max}}/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 4:
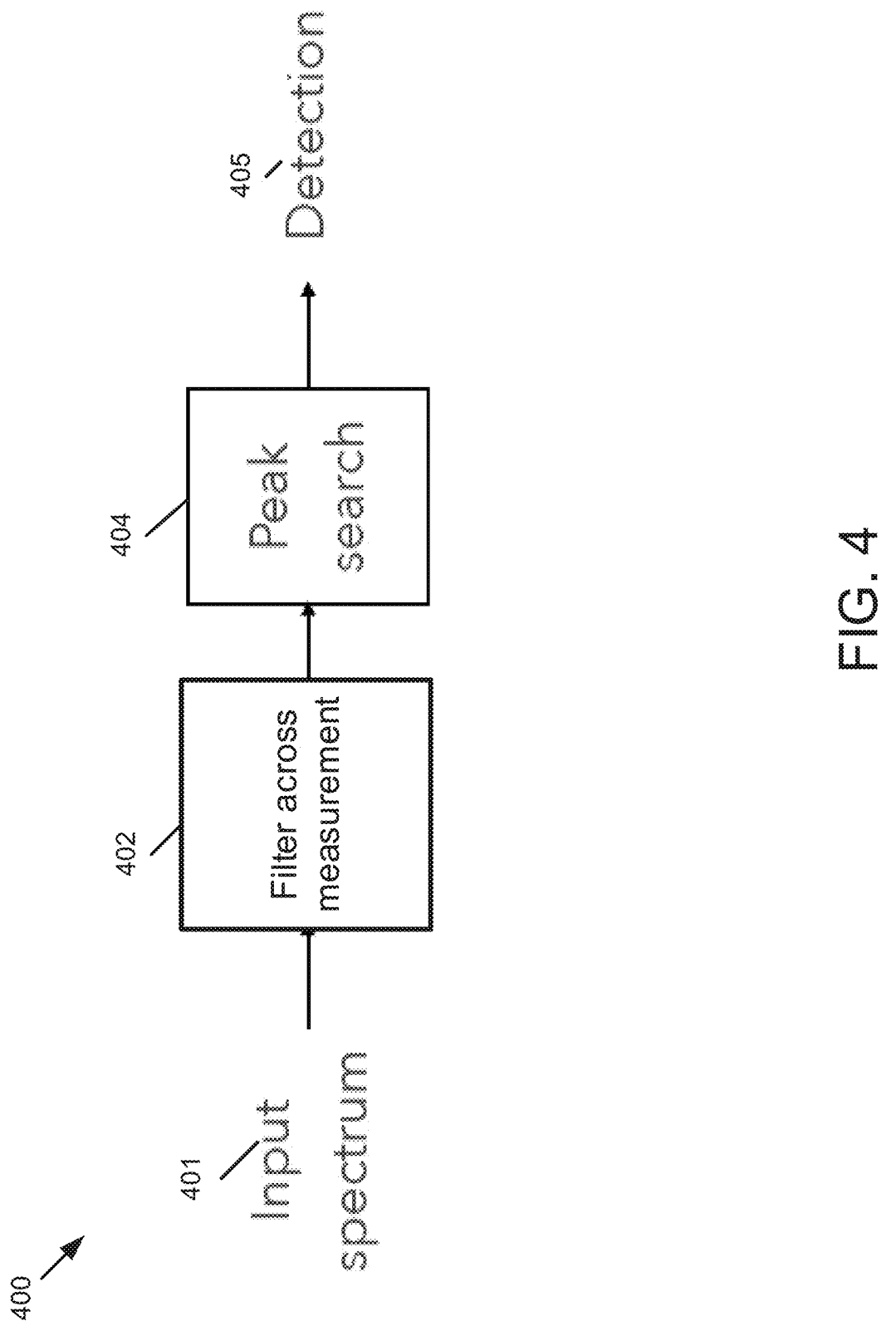
FIG. 4 is a flow diagram illustrating an example of PSD estimation in a LiDAR system according to embodiments of the present disclosure.

FIG. 4 is a flow diagram 400 illustrating an example of PSD estimation in a LiDAR system according to embodiments of the present disclosure. The embodiments described herein provide multiple approaches to combat mirror Doppler spreading. For example, frequency domain techniques and time domain techniques can be employed by embodiments. One approach in the frequency domain techniques includes compensating mirror Doppler spreading by PSD estimation. In this approach, the PSD estimate may be computed by averaging multiple measurements of the input spectrum across time. The output of the PSD estimate is then used in a peak search to find the peak of the received signal, resulting in smaller frequency and energy measurement errors than using the input spectrum directly. In this way, the measured error due to the frequency spreading caused by mirror-induced Doppler may be improved. Thus, more accurate frequency and energy measurements may be achieved, thereby increasing the accuracy in range, velocity, and reflectivity measurements of the target. The above frequency approach may have equivalent time-domain implementations.

As depicted in FIG. 4, the input spectrum 401 of the signal across consecutive measurements may be received. Multiple frequency measurements may be obtained by converting the signals to a frequency domain.

As depicted at block 402, the input spectrum 401 of the signal across consecutive measurements may be filtered, for example, by averaging a number of measurements of the input spectrum. As the number of measurements of the input spectrum increases, the output spectrum converges to the power spectrum density (PSD) of the signal, resulting in more accurate frequency and energy measurements. The PSD estimate may obtained by averaging multiple frequency measurements across time.

As depicted at 404, the output of the PSD estimate may be used in a peak search. The peak of the PSD estimate may be detected to be the true peak of the signal, and the frequency and energy measurement may be based on the peak of the PSD estimate, resulting in smaller frequency and energy measurement errors than using each individual input spectrum directly.

Figure 5A:
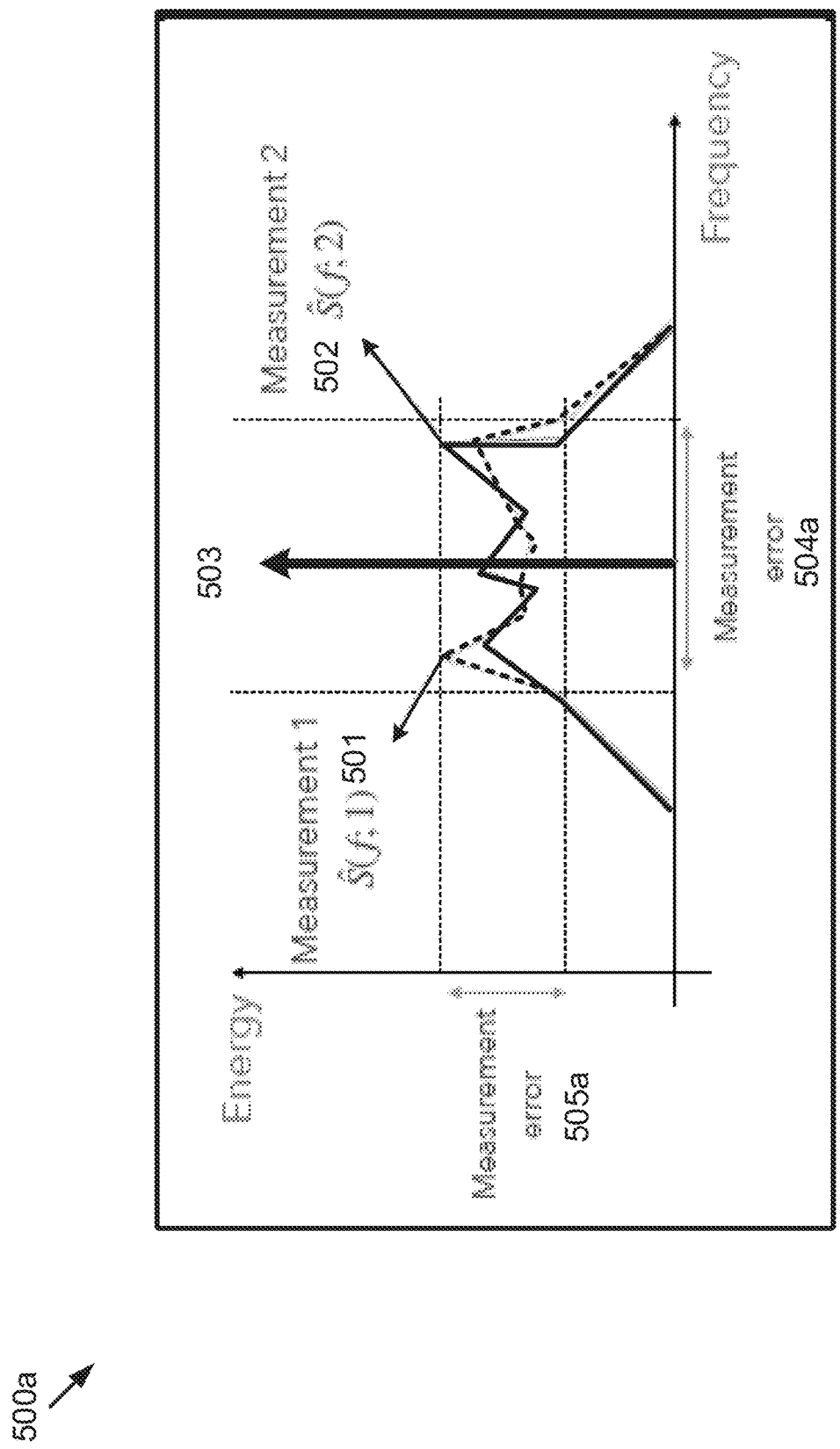
FIGS. 5A-5B are diagrams illustrating an example of PSD estimation in a LiDAR system according to embodiments of the present disclosure.
Figure 5B:
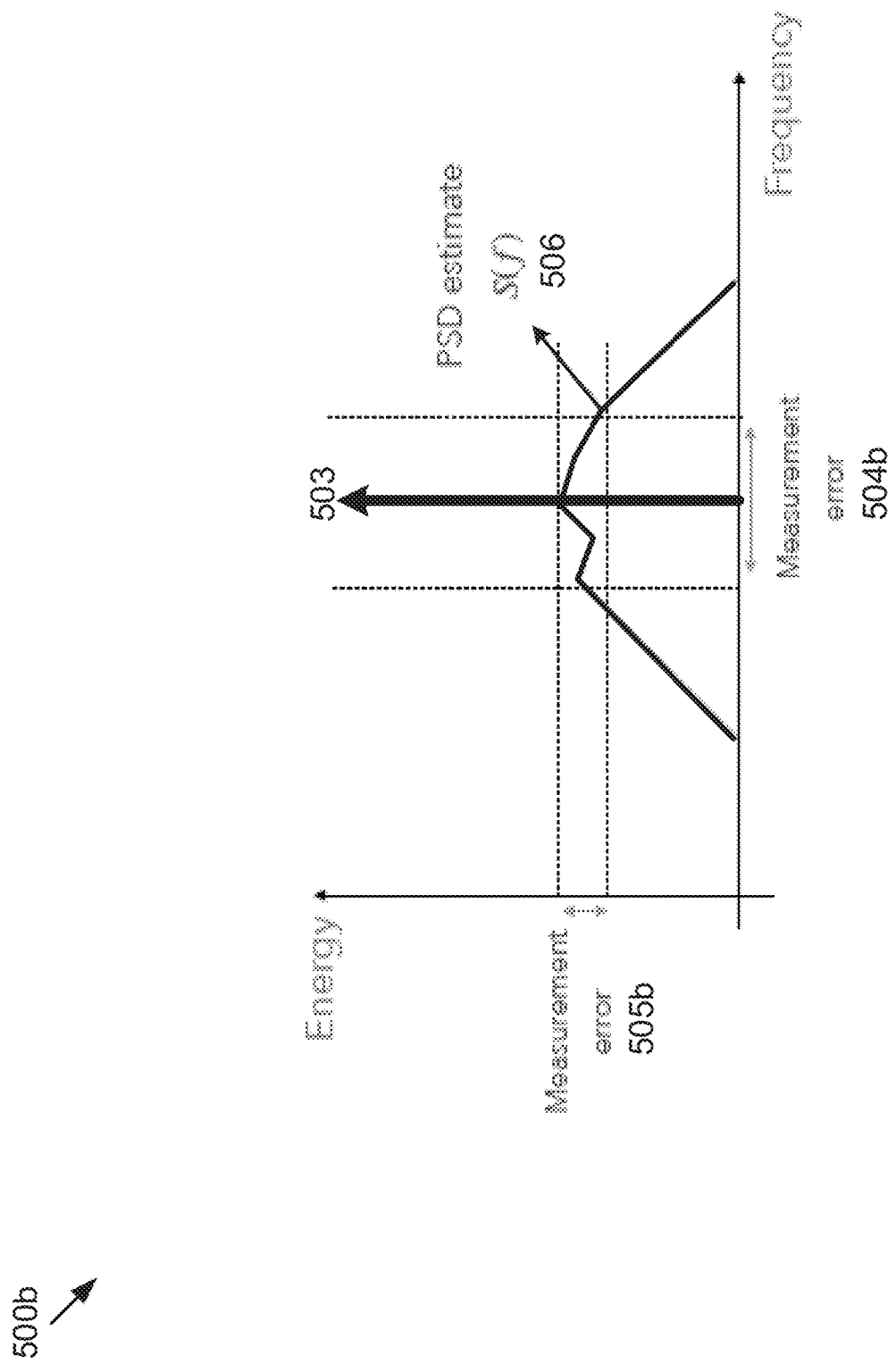

FIGS. 5A-5B are diagrams illustrating an example of PSD estimation in a LiDAR system according to embodiments of the present disclosure. FIG. 5A illustrates two measurements of the input spectrum of the signal. Though only two measurements of the input spectrum are illustrated in FIG. 5, the number of measurements can be any number. As depicted in FIG. 5A, multiple measurements of the input spectrum may be performed. For example, a total of N measurements of input spectrum may be performed, including a first measurement S(f; 1) 501 and a second measurement S(f; 2), etc. For example, both the first measurement S(f; 1) 501 and the second measurement S(f; 2) may have some random realization, resulting frequency measurement error 504a and energy measurement error 505a. The frequency measurement error 504a and energy measurement error 505a may be high due to the randomness of the signal.

FIG. 5B depicts the result of PSD estimate 506. The PSD estimate may be computed by averaging a number of measurements of the input spectrum over time. If there are a total of N measurements of input spectrum S(f; n), the PSD estimate S(f) may be computed by averaging all the measurements over time:

$$S(f) = \frac{1}{N}\sum_{n=1}^{N} \hat{S}(f; n)$$

In one embodiment, averaging the set of first functions includes calculating a magnitude squared of the set of signals. The PSD estimate 506 may have a smaller frequency measurement error 504b and energy measurement error 505b than each individual measurement, as depicted in FIG. 5B.

In one embodiment, the number of measurements may be increased or decreased depending on the current mirror speed. For example, higher mirror speed typically may require higher number of measurements. Higher mirror speed may introduce a larger random realization of the signal, thereby causing a larger frequency measurement error and energy measurement. By having a larger number of measurements, the frequency measurement error and energy measurement error may be further reduced. However, the larger number of measurements may take more time.

In another embodiment, the number of measurements may be increased or decreased depending a desired level of accuracy in frequency or energy measurements. The level accuracy in frequency or energy measurements may be predetermined. The larger number of measurements, the higher the level accuracy in frequency or energy measurements.

In another embodiment, the number of measurements may be increased or decreased depending on the current mirror speed and a desired level of accuracy in frequency or energy measurements. The number of measurements may be determined based on a combination of the current mirror speed and a predetermined level of accuracy in frequency or energy measurements.

Figure 6:
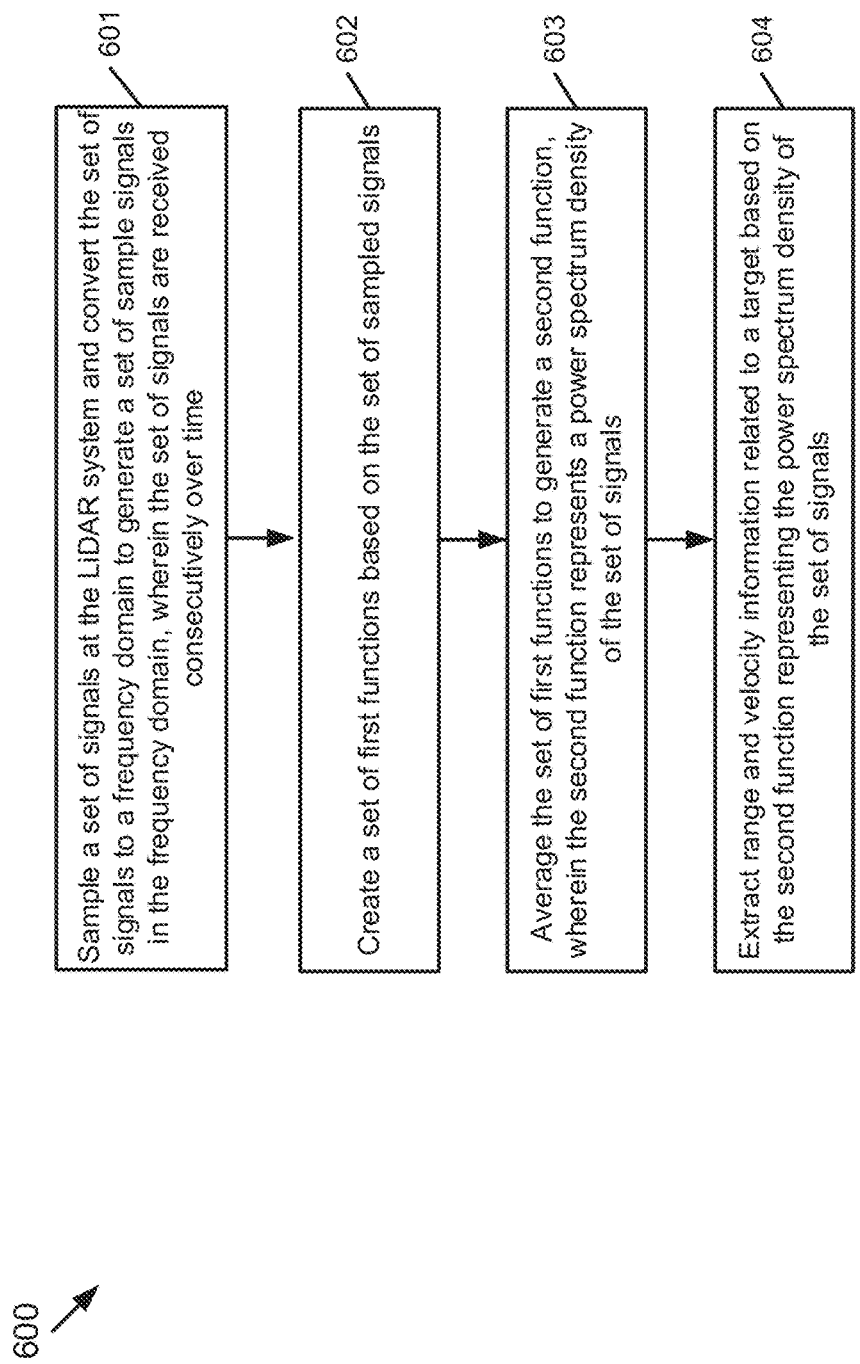
FIG. 6 is a flow diagram illustrating an example of a process of PSD estimation in a LiDAR system according to embodiments of the present disclosure.

FIG. 6 is a flow diagram 600 illustrating an example of a process of PSD estimation in a LiDAR system according to embodiments of the present disclosure. Process 600 may be performed by processing logic which may include software, hardware, or a combination thereof. The software may be stored on a non-transitory machine readable storage medium (e.g., on a memory device). For example, the process 600 may be performed by the PSD module 130 in the signal processing unit 112 of the LiDAR system 100, as illustrated in FIG. 1A-FIG. 1B. By this process, the mirror induced Doppler spreading may be compensated, and the detection accuracy may be improved. Thus, more accurate frequency and energy measurements may be achieved, thereby increasing the accuracy in range, velocity, and reflectivity measurements of the target.

At block 601, a set of signals are sampled at the LiDAR system and the set of signals are converted to a frequency domain to generate a set of sampled signals in the frequency domain.

At block 602, a set of first functions are created based on the set of sampled signals.

At block 603, the set of first functions are averaged to generate a second function. The second function represents a power spectrum density estimate of the set of signals.

At block 604, a peak value of the second function is detected to determine range and velocity information related to a target based on a corresponding frequency of the peak value of the second function.

In one embodiment, averaging the set of first functions may include calculating a magnitude squared of the set of signals.

In one embodiment, each signal of the set of signals may correspond to a measurement of an input spectrum to produce a number of measurements of the input spectrum.

In one embodiment, the number of measurements of the input spectrum may be determined based on a scan mirror speed of the LiDAR system. For example, the number of measurements may correspond to an increase or a decrease of a scan mirror speed of the LiDAR system.

In one embodiment, the number of measurements of the input spectrum may be determined based on a predetermined accuracy threshold in a measurement of an input spectrum.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A method of determining range and velocity information of a target in a light detection and ranging (LiDAR) system, comprising:
    determining a number of measurements of an input spectrum based on a scan mirror speed of the LiDAR system, wherein the number of measurements of the input spectrum is increased in response to an increase of the scan mirror speed of the LiDAR system;
    sampling a set of signals at the LiDAR system and converting the set of signals to a frequency domain to generate a set of sampled signals in the frequency domain, wherein the set of signals are received consecutively over time, wherein each signal of the set of signals corresponds to a measurement of the input spectrum to produce the number of measurements of the input spectrum;
    creating a set of first functions based on the set of sampled signals;
    averaging the set of first functions to generate a second function, wherein the second function represents a power spectrum density estimate of the set of signals; and
    detecting a peak value of the second function to determine range and velocity information related to a target based on a corresponding frequency of the peak value of the second function.

2. The method of claim 1, wherein averaging the set of first functions further comprises calculating a magnitude squared of the set of signals.

3. The method of claim 1, further comprising determining the number of measurements of the input spectrum based on a predetermined accuracy threshold in the number of measurements of the input spectrum.

4. A light detection and ranging (LiDAR) system, comprising:
a processor; and
a memory to store instructions that, when executed by the processor, cause the LiDAR system to:
determine a number of measurements of an input spectrum based on a scan mirror speed of the LiDAR system, wherein the number of measurements of the input spectrum is increased in response to an increase of the scan mirror speed of the LiDAR system;
sample a set of signals at the LiDAR system and convert the set of signals to a frequency domain to generate a set of sampled signals in the frequency domain, wherein the set of signals are received consecutively over time, wherein each signal of the set of signals corresponds to a measurement of the input spectrum to produce the number of measurements of the input spectrum;
create a set of first functions based on the set of sampled signals;
average the set of first functions to generate a second function, wherein the second function represents a power spectrum density estimate of the set of signals; and
detect a peak value of the second function to determine range and velocity information related to a target based on a corresponding frequency of the peak value of the second function.

5. The LiDAR system of claim 4, wherein the LiDAR system is further to calculate a magnitude squared of the set of signals.

6. The LiDAR system of claim 4, wherein the LiDAR system is further to determine the number of measurements of the input spectrum based on a predetermined accuracy threshold in the number of measurements of the input spectrum.

7. A light detection and ranging (LiDAR) system, comprising:
a first optical source to transmit a portion of a first light signal towards a target;
a second optical source to transmit a portion of a second light signal towards a target;
an optical receiver to receive a first return signal from the target based on the first light signal and a second return signal from the target based on the second light signal,
a circuitry; and
a memory to store instructions that, when executed by the circuitry, cause the LiDAR system to:
determining a number of measurements of an input spectrum based on a scan mirror speed of the LiDAR system, wherein the number of measurements of the input spectrum is increased in response to an increase of the scan mirror speed of the LiDAR system;
sample a set of signals at the LiDAR system and convert the set of signals to a frequency domain to generate a set of sampled signals in the frequency domain, wherein the set of signals are received consecutively over time, wherein each signal of the set of signals corresponds to a measurement of the input spectrum to produce the number of measurements of the input spectrum;
create a set of first functions based on the set of sampled signals;
average the set of first functions to generate a second function, wherein the second function represents a power spectrum density estimate of the set of signals; and
detect a peak value of the second function to determine range and velocity information related to a target based on a corresponding frequency of the peak value of the second function.

8. The LiDAR system of claim 7, wherein the LiDAR system is further to calculate a magnitude squared of the set of signals.

9. The LiDAR system of claim 7, wherein the LiDAR system is further to determine the number of measurements of the input spectrum based on a predetermined accuracy threshold in the number of measurements of the input spectrum.

* * * * *